Jan. 31, 1928.
H. B. HOPSON
1,657,829
METHOD AND APPARATUS FOR FORMING TEXTILE MATERIAL
Filed April 26. 1926
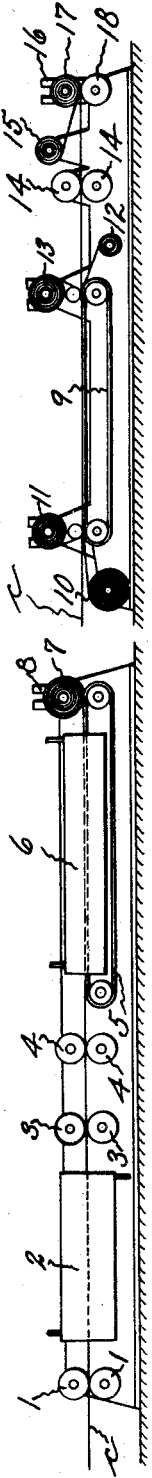
INVENTOR.
Harry B. Hopson
BY
Franklin G. Neal
ATTORNEY.

Patented Jan. 31, 1928.

1,657,829

UNITED STATES PATENT OFFICE.

HARRY B. HOPSON, OF SPRINGFIELD, MASSACHUSETTS.

METHOD AND APPARATUS FOR FORMING TEXTILE MATERIAL.

Application filed April 26, 1926. Serial No. 104,575.

This invention relates to a method of rendering a roving, a spun yarn, or a twisted yarn more elastic or elastic in a more useful manner than the usual methods followed in the production of these articles. The invention includes the new articles produced by the method as well as apparatus for carrying out the method and various features of invention which will be pointed out in the claims.

The new method broadly consists in artificially and independently crimping the individual strands of roving, spun or twisted yarn, and thus producing the articles with what may be termed a permanent wave or crimped characteristic. The degree of crimp or the number of waves per unit of length will depend on the elasticity desired in the strand. It is obvious that the more crimps or waves in the strand, the more elastic it will be.

Heretofore, individual strands of thread or cord have been rendered elastic by particular ways of spinning, twisting or braiding. According to my invention, individual strands of cotton may be rendered elastic in whatever stage they are taken for treatment, whether from rovings or from any of the differently spun or twisted threads or cords, because whatever former well-known product I start with the elasticity is imposed upon it by my crimping method.

For example, I may take an ordinary cord or thread such as used in cord tire constructions and give it any desired number of crimps per inch with a hand crimping iron of suitable size, similar to what ladies use for crimping their hair. A better way is to run the cord between corrugated crimping rolls.

It is true that the so-called artificial permanent wave or crimp in hair as also in the textile cords I treat will ordinarily be lost due to various causes. The chief cause is any longitudinal strain beyond the capacity of the crimp to withstand causing the fibers to reset without crimp. To avoid the loss of benefit from the crimping operation, I plan as one feature of my invention to use my crimped strands in association with other material, or under circumstances where the crimp will be retained long enough or permanently for its useful purpose.

As an illustration, I plan to embed my crimped strand in rubber and one of the principal uses I have in mind for the invention is in the art of making up laminated cord and rubber layers for building the strain-resisting carcass of cord tires.

The invention will be made clear by reference to the accompanying drawings.

Fig. 1 shows one form of apparatus for crimping a series of cords to give them a sufficiently permanent set for subsequent use;

Fig. 2 shows an apparatus for laying the crimped cords between one or more sheets of uncured rubber to make a laminated structure suitable for vulcanization to cause the crimp to be permanent;

Fig. 3 shows an apparatus for the application of my crimped cord to and between sheets of warm rubber on an ordinary rubber calendar for mass production in a tire factory;

Fig. 4 shows matched crimping plates for making the simple form of my product by hand;

Fig. 5 shows the simple crimped textile strand; and

Fig. 6 shows in the cross-section of two rubber sheets the crimped strand embedded therein as a finished laminated product with the rubber.

Due to the wide knowledge by men skilled in the art of the means and apparatus for handling independent textile strands, I have not complicated my drawings by showing those detail operating parts, which can be readily supplied as pure mechanical detail as understood from my description.

Referring to Fig. 1, a series of parallel cords $c$ may be drawn under tension through rolls 1 from any suitable source of supply as a creel. The rolls 3 beyond the rolls 1 are positively driven to draw the cords $c$ through a closed moistening chamber 2. The latter, of course, has openings at each end sufficient for the passage of the cords. Steam may be used for moistening purposes so that the cords will be substantially heated as well as moistened during their passage through the chamber 2.

It is important to have the rolls 3 draw the cords at a uniform rate under uniform tension so that they will be delivered to the crimping rolls 4 in a uniform manner. The crimping rolls 4 may be of metal when it is desired to heat them internally, but ordinarily they are preferably of wood such as highly polished maple. These rolls each have their surfaces corrugated so that the corrugations cross the cords. In this respect the rolls are like toothed cylinders or gears except that the intermeshing teeth are carefully rounded to avoid cutting the cords and yet of sufficient size to crimp the cords. The latter pass between the crimping rolls 4 which are pressed together sufficiently by ordinary spring mounted bearings or bearing adjusting means to force the cords firmly into successive corrugations of the rolls.

The number of corrugations on the rolls per inch of periphery, of course, determines the number of crimps per inch of the cords passing through the rolls. On this account it is desirable to drive the rolls 3 so as to deliver the cords to rolls 4 to compensate for the length of cord taken up by the crimping operation. The delivery of cords from rolls 3 should preferably be fast enough as compared to the take up of rolls 4 so that the cords can be crimped while they are free of substantial tension, and can be delivered from rolls 4 without substantial tension whereby the crimp may be retained in the cord to the greatest degree. The driving relation between rolls 3 and rolls 4 is with this explanation a simple matter of proper gearing from the main drive shaft. When it is desired to change the number or size of the crimps imposed on the cords, suitably patterned rolls for the desired crimping operation may be inserted as rolls 4 and the driving gears changed to give the desired relative speed for rolls 3 and 4. It is desirable to drive all rolls 3 and 4 positively to best control the crimping operation.

As the cords are delivered from rolls 4, I preferably deposit them on a delivery belt 5 to avoid drawing them under tension in succeeding operations. They pass with their supporting conveyor 5 through a suitable drying chamber 6. The conveyor is preferably driven at the same speed as the delivery of the crimped cords from rolls 4. The drying chamber is supplied with dry heat as by dry air so as to dry and set the crimps in the cords. The latter may be rolled up on the spool 7 bearing on top of the conveyor 5 and mounted in slot bearings 8, which is a usual form of wind-up directly from a conveyor by which tension in the wind-up operation is avoided. The cords thus delivered have been moistened, crimped and dried while crimped, whereby they will retain their form sufficiently for subsequent use. There are other ways to retain the crimp as will be pointed out.

One use to which the crimped cord may be put is to combine it with rubber to serve as the strain-resisting element with the rubber in its elastic movement. Its particular value in this use is that the elasticity of the cord will more nearly approach the elasticity of the rubber. When the rubber is vulcanized with the cord bonded to it in crimped condition, the crimp is retained by the permanent set of the rubber. As the rubber stretches and then returns to its original condition, it returns the bonded cord to its original crimped condition. Another use which the crimped cord has with rubber even before vulcanization is that a sheet of plastic rubber having crimped cords as the strain-resisting element may be shaped, as for example to tire form, with less straining of the cord or excessive displacement of cord and rubber than in uncrimped cord of the usual kind.

Braided cord and specially twisted cord have heretofore been made up with the object of giving the same general result of increased elasticity in association with rubber at least to some degree; but I believe not to as satisfactory a degree as my crimped cord when combined with rubber. I believe I am the first to point out the advantages of controlling the elasticity of the strain resisting cord through a wide range by the crimping operation. Of course, woven cord has a definite crimp due to the weft thread put in during the weaving operation. But such crimp is an incident of the weaving and at best limited to a narrow degree of usefulness, so far as the crimp is concerned. Furthermore, the woven fabric has one cord, the weft, crossed with another, the woof, and a sawing action takes place in use. The elasticity in woven cord due to the crimp is not available to any substantial degree until the weft thread is broken to release this crimp for action with the rubber. While I do not desire to limit my invention with regard to the degree of elasticity added to the cord by my crimping step, whether of less than or equal to the degree of crimp due to weaving, I particularly point out that by my method I can far exceed in amount the elasticity added to the cord as crimped in weaving and that it is preferred to add elasticity to the cord in such increased amount.

In Fig. 2, I have shown a conveyor 9 which may be placed in line with conveyor 5 and driven at the same speed. In this case the cords c, instead of being wound up in their bare crimped condition, meet a layer of tacky rubber fed on a liner from supply roll 10. A similar supply roll 11 feeds a second layer of such rubber so that the cords are fed between two layers of rubber and along belt conveyor 9 without longitudinal strain. The liners for the rubber sheets are wound upon rolls 12 and 13. The composite sheet of crimped cords between two layers of rubber are drawn along by pressure rolls 14 positively driven at the conveyor speed and wound up in laminated form on roll 17 with a liner from roll 15. This wind-up 16 and 17 is similar to the wind-up 7 and 8 except that a positively driven roll 18 takes the place of the conveyor belt for driving roll 17 by friction so that its peripheral speed will always be the same as the speed of delivery of the laminated sheet from belt 9.

In Fig. 3 I have shown the crimping operation arranged adjacent a known form of rubber calender so that the laminating of the crimped cord between two sheets of hot rubber may take place directly on the calender for mass production, particularly in a tire factory.

The operation of thus laminating closely spaced cords without weft threads on a calender is already known but so far as I know such cords have always been fed under longitudinal strain and combined with the rubber sheets while under such strain. The operation heretofore carried out does not permit a desired elasticity of the cord in the laminated structure except as such cord may be particularly spun or twisted to give it such elasticity. This prior practice is expensive and I believe is not nearly as useful, all things considered, as the results of my method, apparatus and product.

In Fig. 3 rolls 20, 21, 22 and 23 are arranged in the ordinary manner to sheet out rubber from banks 24 and 25. The roll 26 is preferably a grooved roll arranged to press the cords c against the sheet of rubber on roll 22 from bank 25. The cords then pass with roll 22 and meet the rubber on roll 21 from bank 24. As the cords pass with the rubber between rolls 21 and 22, the second rubber sheet is applied over the cords and the laminated product is ready for cutting into tire building strips or for other uses. The apparatus and operation so far described on this calender is not my invention as it is already known and in use for making uncrimped fillerless or weftless rubberized cord sheets in the tire building art.

With this apparatus I provide a suitable means, indicated generally as rolls 27, for the purpose of drawing the spaced arrangement of parallel and independent cords from a creel supply with uniform tension, as such cords have formerly been fed up to and adjacent the calender. The means for this purpose is well known in the art and I have only indicated the step by showing rolls 27 without any attempt to show the detail apparatus for this uniform tension drawing purpose.

Between the rolls 27 and the bite of rolls 26 and 22 I arrange my crimping rolls 28, preferably all as near together and to the calender as possible under working conditions. The crimping rolls are both positively driven and the relative speed of such rolls and the delivery from rolls 27 is carefully arranged just as the relative speed between the delivery rolls 3 and crimping rolls 4 already described in connection with Fig. 1.

The rolls 27 deliver the cords fast enough to the crimping rolls 28 so that the latter may crimp all the cords and deliver them in crimped condition without substantial longitudinal tension and without lateral distortion or appreciable looseness except that due to the crimp, to the pressure roll 26. To keep the cords spaced and to prevent them from tangling, I prefer to place a separator such as a suitable comb or like well-known device shown at 29 between rolls 28 and applying roll 26. The latter roll may be grooved to apply the cords in proper alignment, and it should be understood that roll 26 is mechanically pressed against roll 22 so that the crimped cords are embedded in the rubber on the latter roll about as they would be if roll 26 were a large calender roll like 22 and arranged as the fifth roll of a calender coating operation. The product P is continuously delivered and handled as a laminated sheet according to known means and usually wound up with a liner ready for subsequent operations as cutting.

By changing rolls 28 to desired patterns of corrugations and the relative speed of such rolls with the delivery from rolls 27, the number and depth of corrugations may be what is desired. Where a wide series of cords is fed to the calender and closely spaced, the crimps given the cords by rolls 28 should be not more in amplitude than about half the spacing between the cords or anything less than such amplitude to avoid overlapping and insure a complete covering for each cord with rubber on the calender, as this is desirable. But the number of corrugations per inch may be made according to the elasticity desired and is limited only by that degree to which crimps may be made without cutting the cords.

It should be noticed that in the operation arrangement shown in Fig. 3 the cords are not moistened, crimped and then dried. On the contrary, they are so fed and embedded in the rubber that they retain all inherent elasticity of each cord plus whatever degree of elasticity is added by the number and amplitude of the crimps as may be desired, from zero to the maximum number and size permitted by working conditions. The advantage of the operation when no crimps are retained in the cord will be specially considered as the zero crimping condition. The fact that the cords are fed to the rubber without any substantial longitudinal tension is important as it helps retain all inherent elasticity in the cord whether crimped or not. If working conditions at the calender are such that a slight amount of longitudinal tension is desirable to properly feed the cords from rolls 27 to the bite of rolls 26 and 22, the crimping may be just enough to let such tension take out the crimps and then the cords will be embedded without crimps but without longitudinal strain on the cords as they are embedded. This is the zero condition of cords above referred to and this zero condition represents the full normal elasticity of the strand or cord without crimp. The rubber layers, of course, retain and fix such elasticity or crimp in the cords as exists when the cords are embedded in the rubber sheets.

In Fig. 4 I have shown two corrugated plates 30 and 31 which may be of iron. The adjacent faces have matched corrugations. To make my product in a simple way I may lay one or more rovings, spun or twisted yarns cross-wise of the corrugations on plate 30. These strands are preferably but not necessarily moistened. The plates are preferably heated. By pressing both plates together the strand or strands are crimped between them. Then the strand may be removed in a fixed crimped condition as shown in Fig. 5.

To make a composite cord or laminated sheet I may leave the strand or strands in crimped condition on one of the plates, place a layer of plastic rubber or rubber cement or latex over the plate, and press the materials together. Then by reversing the operation and placing the materials on the other plate, I may place additional rubber over the exposed strand and by then pressing the plates together I obtain the composite cord or strand, or laminated sheet accordingly as one or a parallel spaced series of strands are covered as shown in Fig. 6. If this composite cord or sheet is then vulcanized, the rubber is set and each crimped strand is fixed and bound to the rubber in its crimped condition. Or a similar but not the full result can be obtained by using vulcanized rubber with a cemented surface to bind the cords, or by building up the rubber covering on the crimped cord by applying liquid rubber in any of its various forms.

Whether the strain-resisting strand is single or associated with other spaced strands in a sheet, it is clear as the rubber stretches the strain-resisting strands will stretch with the rubber to a far greater degree before the elastic limit is reached or dangerously approached than in the composite cords or layers as ordinarily built up. Furthermore, each strand may stretch with the rubber without any sawing action of cord upon cord as in the case of rubberized woven fabric. Again the bond between the cord and rubber will be retained under more severe conditions of stretching or distortion than if the cord were not crimped.

When a laminated sheet of cords surrounded by a rubber is made up according to my invention, it may be used in the tire making art substantially the same as laminated rubber sheets are now used. The principal difference is that it will stretch better with the rubber. It is quite possible that in forming such sheets in tire form substantially all the crimp will be taken out in the tire building operations. Nevertheless the strain-resisting members will have more elasticity in the finished tire than they would have if the stretching due to the building operations were not compensated for in part or wholly by the take-up due to the crimped condition of the cords at the start. This is of particular importance in balloon tires where the degree of elasticity of the strain-resisting members of the carcass is important. In such tires, where the flexing action is at a maximum in tire use, the chance of breaking the bond between the cord and rubber is least where the elasticity of the cord more closely approaches the elasticity of the rubber or the useful range of such elasticity.

Having described my invention in its various aspects, I claim:

1. The method of treating textile strands or cords which consists in crimping textile strands or cords independently without longitudinal strain and then bonding the cords thus crimped in rubber sheets so as to retain the crimps and increase the elasticity of the composite structure.

2. The method of making laminations of rubber and spaced parallel strain-resisting cords with rubber which consists in continuously calendering two sheets of warm rubber, continuously crimping the strain-resisting cords, continuously feeding the crimped cords between the rubber sheets immediately after the crimping operation, and pressing the cords and rubber together.

3. An apparatus for making tire carcass material and the like comprising a calender apparatus adapted to continuously sheet out two layers of warm rubber, means to continuously feed a series of parallel cords up to the calender apparatus, and means adjacent the latter to apply the cords to and between the rubber sheet without longitudinal tension on the cords.

4. An apparatus for making tire carcass material and the like comprising a rubber coating calender apparatus and means to continuously apply a series of unconnected parallel cords in crimped condition to the rubber on the calender, said calender apparatus having means to completely cover said cords with rubber while in crimped condition.

HARRY B. HOPSON.